United States Patent
Huang et al.

(10) Patent No.: US 7,669,872 B2
(45) Date of Patent: Mar. 2, 2010

(54) FOLDING MECHANISM

(75) Inventors: Alfred Huang, Taichung (TW);
Wen-Pin Chiu, Taichung (TW);
Yung-Chen Lai, Taichung (TW);
Yu-Che Huang, Taichung (TW)

(73) Assignee: Cycling & Health Tech Industry R & D Center, Taichung (TW)

( * ) Notice: Subject to any disclaimer, the term of this patent is extended or adjusted under 35 U.S.C. 154(b) by 34 days.

(21) Appl. No.: 11/897,818

(22) Filed: Aug. 31, 2007

(65) Prior Publication Data

US 2008/0067779 A1 Mar. 20, 2008

(30) Foreign Application Priority Data

Sep. 14, 2006 (TW) .............................. 95134033 A (51) Int. Cl.
*B62K 3/14* (2006.01)

(52) U.S. Cl. .................... 280/287; 280/278; 280/279

(58) Field of Classification Search ................. 280/287, 280/278, 279
See application file for complete search history.

(56) References Cited

U.S. PATENT DOCUMENTS

| 3,512,816 | A | * | 5/1970 | Katano | 403/102 |
| 4,284,288 | A | * | 8/1981 | Fulton | 280/278 |
| 4,417,745 | A | * | 11/1983 | Shomo | 280/287 |
| 4,448,435 | A | * | 5/1984 | Hon | 280/278 |
| 5,398,955 | A | * | 3/1995 | Yeh | 280/287 |
| 6,135,478 | A | * | 10/2000 | Montague | 280/287 |
| 6,523,223 | B2 | * | 2/2003 | Wang | 16/324 |
| 7,175,192 | B1 | * | 2/2007 | Lu | 280/287 |
| 7,445,224 | B2 | * | 11/2008 | Whyte | 280/278 |
| 2002/0067020 | A1 | * | 6/2002 | Wang | 280/263 |
| 2002/0167151 | A1 | * | 11/2002 | Tseng | 280/287 |
| 2006/0175797 | A1 | * | 8/2006 | Sanders | 280/287 |
| 2007/0273125 | A1 | * | 11/2007 | Appleman | 280/278 |
| 2008/0088113 | A1 | * | 4/2008 | Menayan | 280/287 |

FOREIGN PATENT DOCUMENTS

EP  378362 A1 * 7/1990

* cited by examiner

*Primary Examiner*—Lesley Morris
*Assistant Examiner*—Marlon A Arce
(74) *Attorney, Agent, or Firm*—Charles E. Baxley (57) ABSTRACT

The disclosed folding mechanism comprises a rear frame member of a bicycle, which has a combining structure positioned at a front portion thereof, wherein the combining structure includes a first joining surface; a front frame member of the bicycle, which has a second joining surface positioned at a rear portion thereof for being joined with the first joining surface; at least one pivot structure, which is provided at an edge of the combining structure for connecting the front frame member, such that the front and rear frame members can relatively move on the pivot structure; and at least one binder, which is deposited at the combining structure of the rear frame member and a position on the front frame member adjacent to the combining structure for fixing the second joining surface of the front frame member and the first joining surface of the rear frame member at a combining position where the two joining surfaces contact mutually. By using the folding mechanism, a bicycle equipped with the same can be folded or expanded.

5 Claims, 7 Drawing Sheets

FOLDING MECHANISM

BACKGROUND OF THE INVENTION

1. Technical Field

The present invention relates to folding bicycles and, more particularly, to a folding bicycle frame with enhanced strength.

2. Description of Related Art

Figure 1:
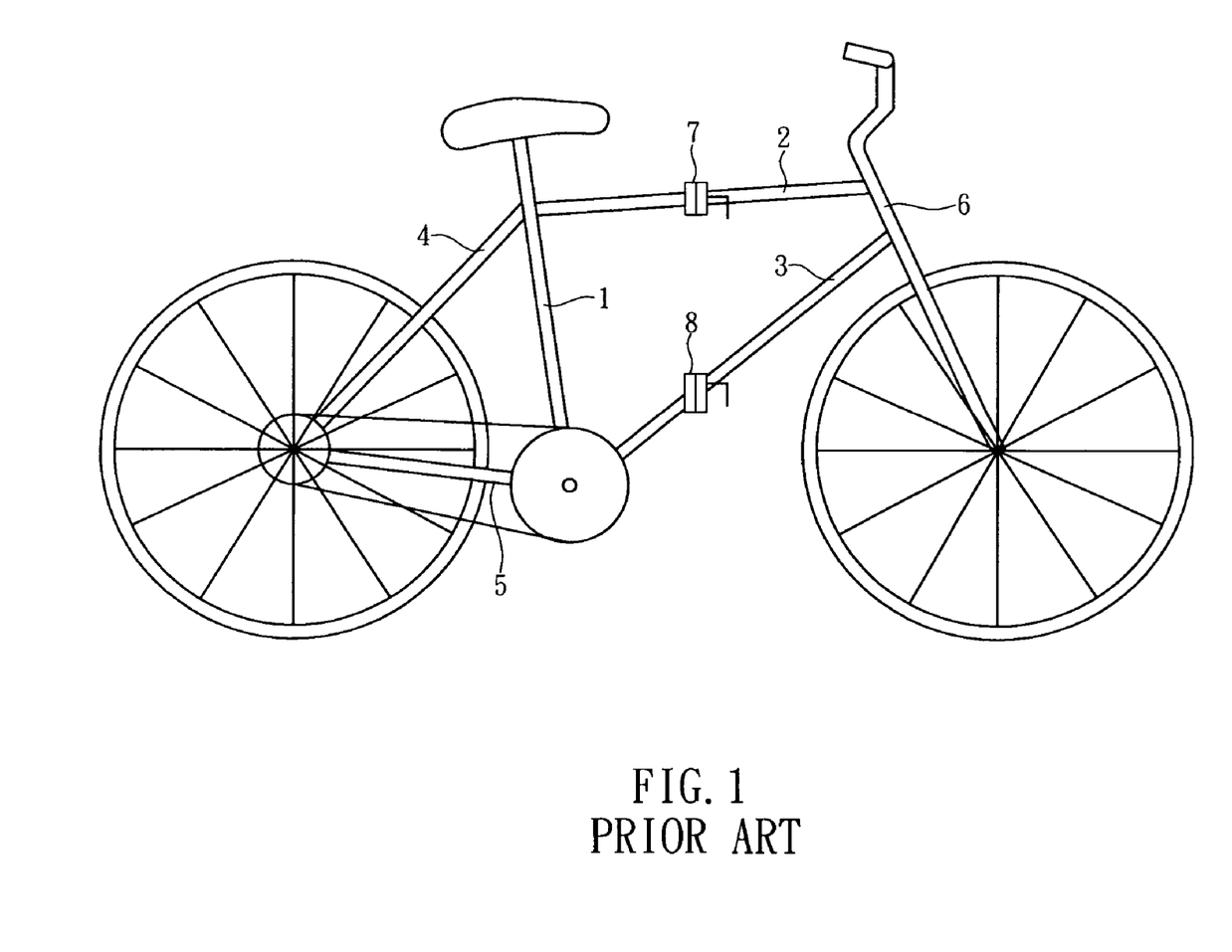
FIG. 1 is a schematic drawing of a conventional folding bicycle.

A conventional bicycle frame, as illustrated in FIG. 1, primarily comprises a seat tube 1 connected with a top tube 2, a down tube 3, a pair of seat stays 4 and a pair of chain stays 5 connected, respectively. Each of the top tube 2 and the down tube 3 has a front end thereof combined with a head tube 6, respectively. Each of the seat stays 4 and the chain stays 5 has a rear end thereof jointed at a rear fork tip. It can be observed that the seat tube 1, the top tube 2, and the down tube 3 collectively construct a triangular frame as a main force structure of the entire bicycle frame. The integrity of the force structure ensures the structural strength and resistance to compression, bend and deformation. However, a conventional folding bicycle frame typically has folding joints 7, 8 arranged at the middle parts of the top tube 2 and the down tube 3. Such design unquestionably affects the integrity of the aforementioned triangular frame and results in weakening the structural strength and resistance to compression, bend and deformation of the bicycle frame.

U.S. Pat. No. 4,900,047 (herein after referred to as '047 Patent) discloses a folding bicycle of another type. FIG. 1 of '047 Patent shows a seat tube with a top thereof connected to a top tube and a pair of seat stays. The seat tube further has a bottom thereof connected with a down tube, and a pair of chain stays. In a lateral perspective, the top tube, the down tube, the chain stays and the seat stays collectively construct a quadrilateral frame. The seat tube is positioned across the quadrilateral frame as a diagonal. Actually, the seat tube is composed of a first seat tube and a second seat tube are arranged in a partially concentric telescoping manner. The first seat tube is connected with the top tube and the down tube, while the second seat tube is connected with the set stays and chain stays. By the relative rotation between the first and second seat tubes, the quadrilateral frame can be folded or expanded. After the quadrilateral frame is expanded, a pair of quick release binders may be implemented to fix the frame at the expanded position.

However, the above design may have some disadvantages. First, since the seat tube component is constructed by concentrically placing the first seat tube inside the second seat tube, as shown in FIGS. 2A through 2D of '047 Patent, the joining area between the two seat tubes is not large enough to provide sufficient joining strength. Such insufficient joining strength appears on the main force structure of the bicycle frame may liable to render slant and deformation of the bicycle frame.

As '047 Patent implements the concentric rotation between the first and second seat tubes to fold or expand the quadrilateral frame, the front wheel of the bicycle comes close to and stay abreast the rear wheel of the bicycle when the bicycle is folded. However, since the front frame member and the rear frame member still include a relatively larger angle, the folded bicycle still consumes a relatively larger floor space for storage.

SUMMARY OF THE INVENTION

The present invention has been accomplished under these circumstances in view.

It is one objective of the present invention to provide a novel design of a folding bicycle frame.

The disclosed folding mechanism comprises a rear frame member of a bicycle, which has a combining structure positioned at a front portion thereof, wherein the combining structure includes a first joining surface; a front frame member of the bicycle, which has a second joining surface positioned at a rear portion thereof for being joined with the first joining surface; at least one pivot structure, which is provided at an edge of the combining structure for connecting the front frame member, such that the front and rear frame members can relatively move on the pivot structure; and at least one binder, which is deposited at the combining structure of the rear frame member and a position on the front frame member adjacent to the combining structure for fixing the second joining surface of the front frame member and the first joining surface of the rear frame member at a combining position where the two joining surfaces contact mutually.

It is one objective of the present invention to provide a folding mechanism that allows a front frame member and a rear frame member of a bicycle to relatively move on a pivot structure so as to make the bicycle be folded or expanded.

It is another objective of the present invention to provide a folding mechanism wherein a front frame member and a rear frame member of a bicycle are integral frame structures so as to maintain the structural strength and resistance to compression, bend and deformation of both of the frame members.

It is another objective of the present invention to provide a folding mechanism that positions a pivot structure at an edge of a combining structure where is not aligned to the lengthwise axis of a bicycle. As the pivot structure is positioned at the position apart from the lengthwise axis, the front frame member can be positioned abreast and close to the rear frame member so as to minimize the included angle between the front and rear frame members at a folded position of the frame members.

It is another objective of the present invention to provide a folding mechanism wherein when a front frame member and a rear frame member are relatively expanded for use, a first joining surface of a combining structure of the rear frame member and a second joining surface on a seat tube of the front frame member come to contact mutually. The present invention provides an adequate contacting area between the first joining surface and the second joining surface so as to enhance the stability of combination by a means of maximizing the contacting area between the first and the second joining surfaces. The means includes arranging the second joining surface extended along a lengthwise measure of the seat tube, and make the first joining surface have a lengthwise measure similar to that of the second joining surface. Thereupon, the first joining surface and the second joining surface are made at most of the lengthwise measure of the front frame member and the rear frame member, so as to maximize the contacting area between the first joining surface and the second joining surface.

It is still another objective of the present invention to provide a folding mechanism wherein when the first joining surface and the second joining surface are joined, a binder is implemented to exert an external force to the joined joining surfaces so as to enhance the stability of the combination between the joining surfaces. Thereby, the seat tube and the combining structure can be secured from separating so that the stability of the combination between the front frame member and the rear frame member is ensured. As the combination between the front and rear frame members are firm and stable, the structural strength and resistance to compression, bend and deformation of a folding bicycle equipped with the disclosed subject matter during use can be improved.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

Figure 2:
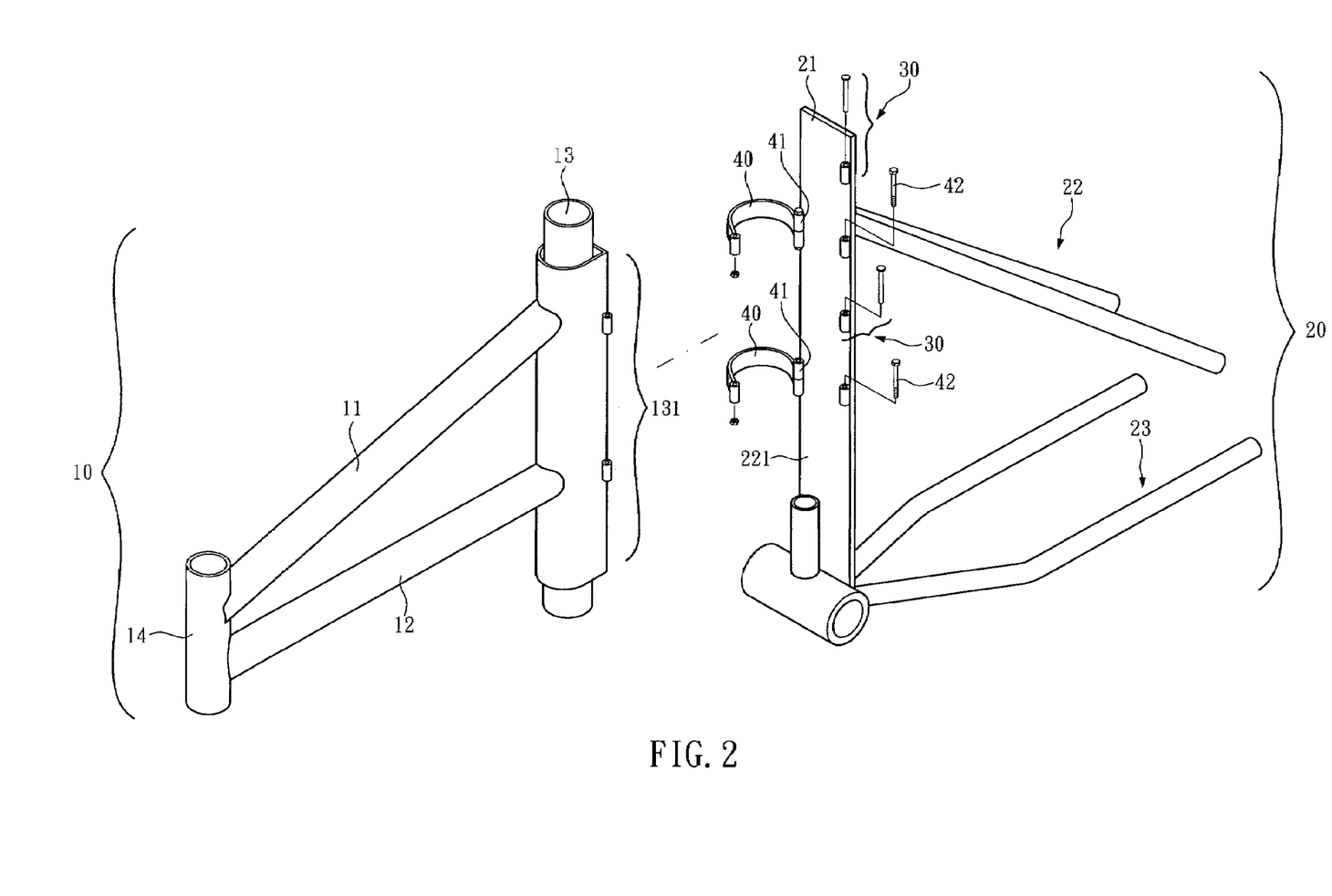
FIG. 2 is a right exploded view of the disclosed subject matter according to one embodiment of the present invention.
Figure 3:
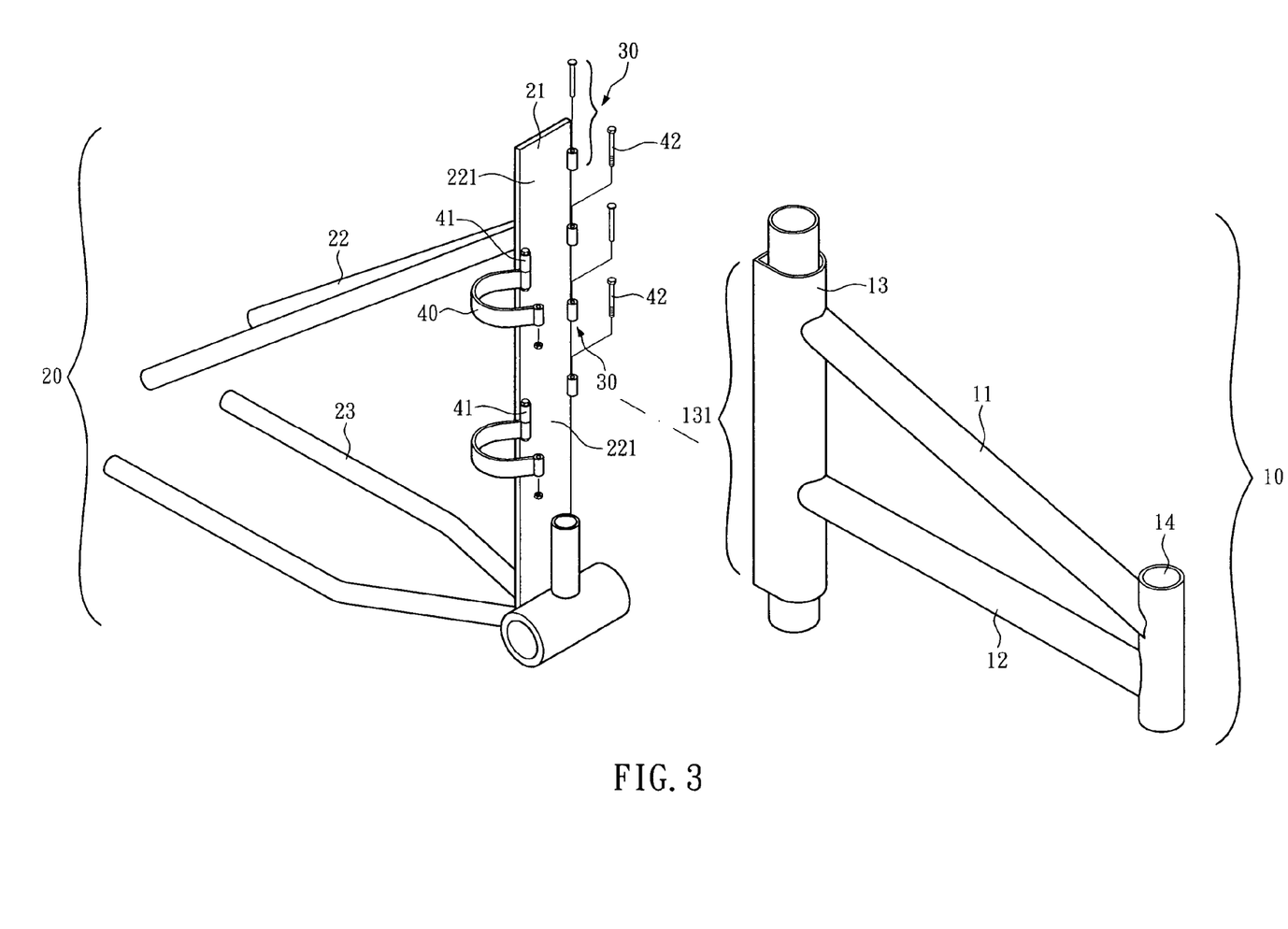
FIG. 3 is a left exploded view of the disclosed subject matter according to the embodiment of the present invention.

For clarifying the concept of the present invention, a preferred embodiment is herein provided for the purpose of illustration and it is to be stated firstly that the components of the depicted embodiment are not made to scale. As shown in FIGS. 2 and 3, a folding frame of a bicycle according to the present invention primarily comprises a front frame member 10 and a rear frame member 20. The front frame member 10 includes a top tube 11, a down tube 12, a seat tube 13 and a head tube 14. The top tube 11 and the down tube 12 are horizontally welded with the seat tube 13 and head tube 14, which are vertically positioned. The rear frame member 20 is primarily composed of a combining structure 21, a rear fork 22 and a pair of chain stays 23 welded together. Front ends of the rear fork 22 and the chain stays 23 are welded with the combining structure 21, respectively, while rear ends of the same components are connected with a rear fork tip (not shown).

Figure 4:
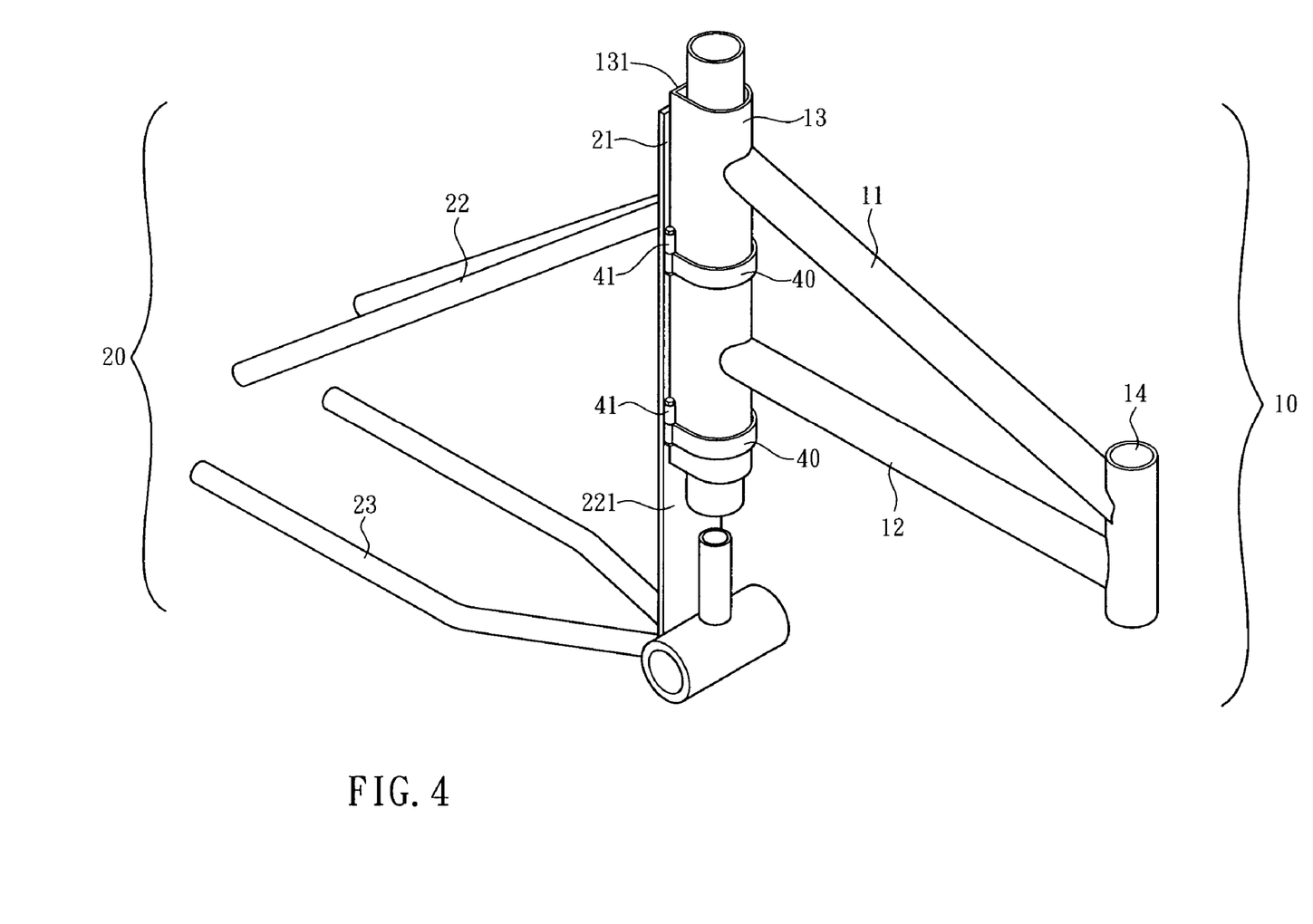
FIG. 4 is an assembly drawing of the embodiment of the present invention.
Figure 5:
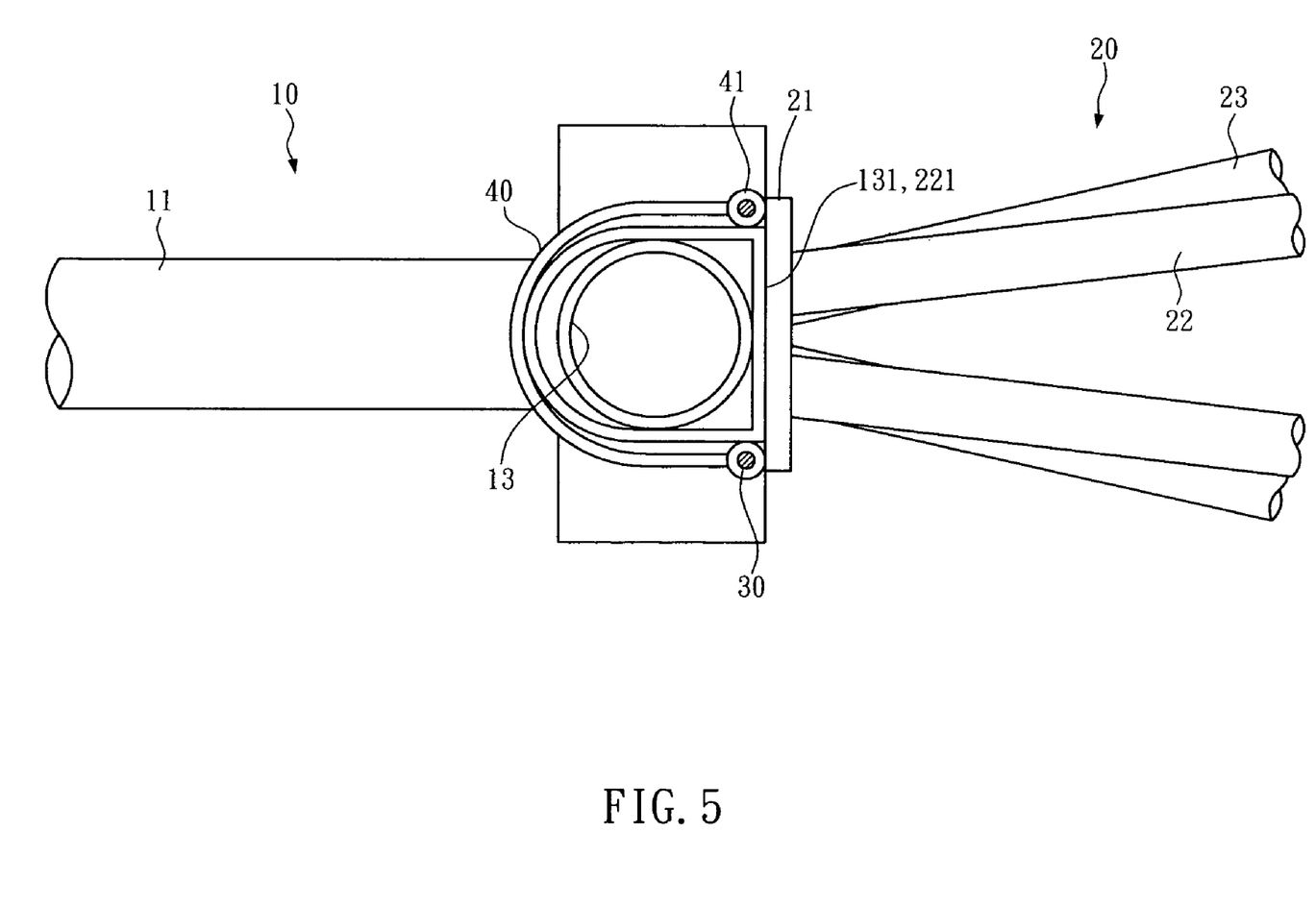
FIG. 5 is a top view of the embodiment of the present invention.
Figure 6:
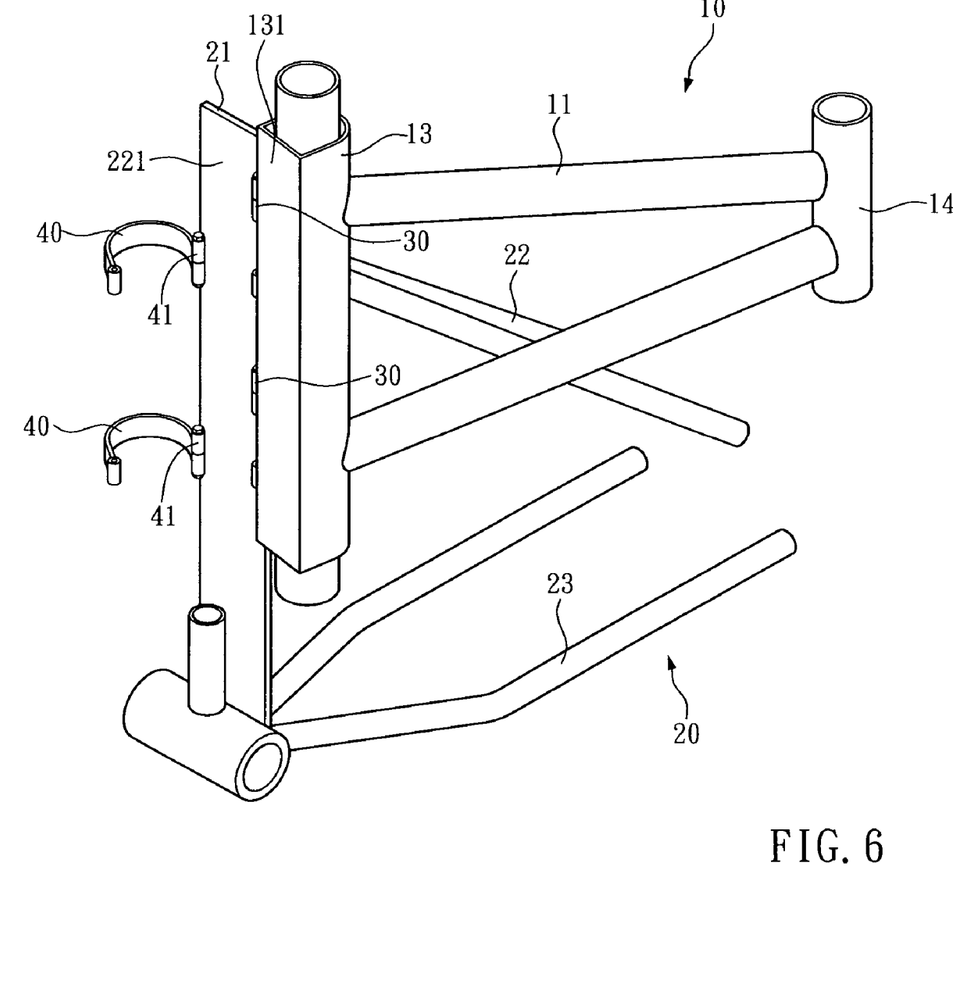
FIG. 6 is a perspective view showing the disclosed subject matter folded according to the embodiment of the present invention.
Figure 7:
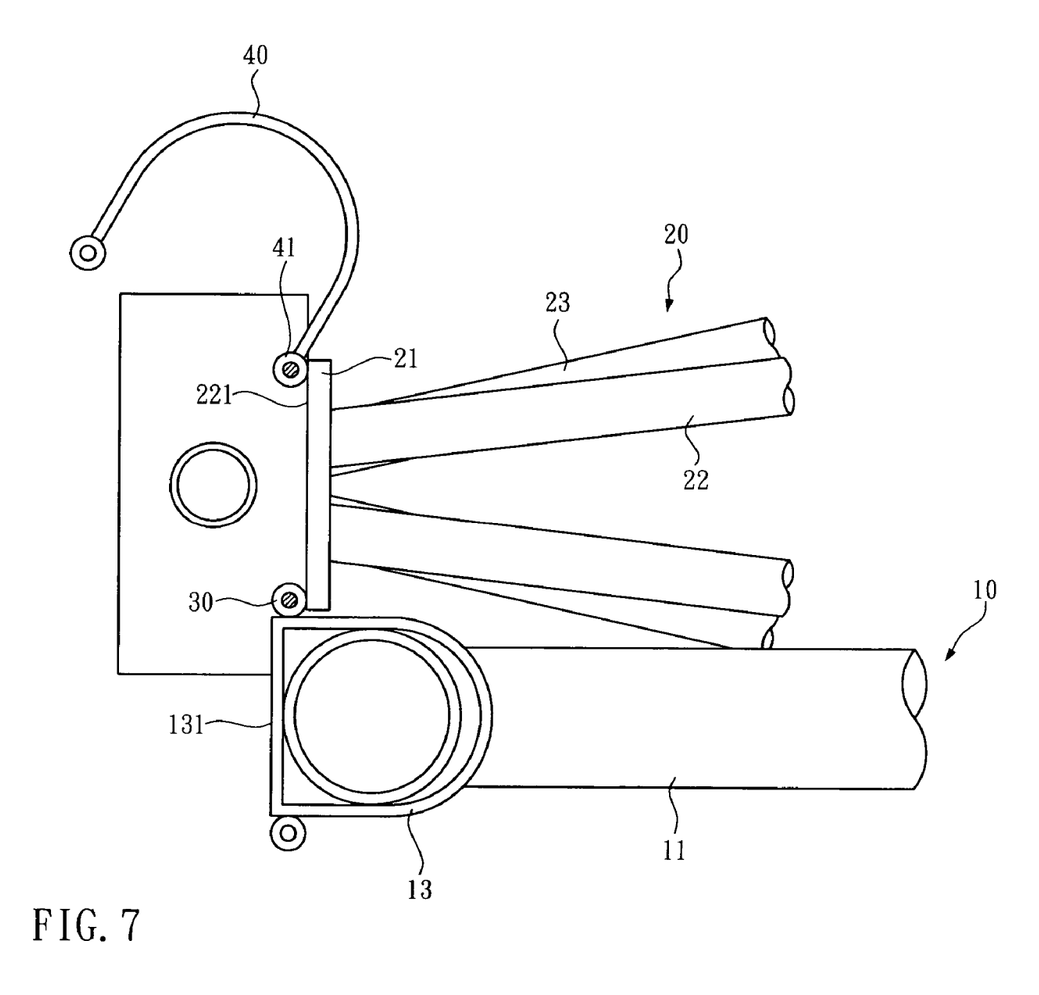
FIG. 7 is a top view showing the disclosed subject matter folded according to the embodiment of the present invention.

At least one pivot structure 30 is deposited at either adjacent edges of the combining structure 21 and the seat tube 13. The combining structure 21 has a first joining surface 221 and the seat tube 13 has a second joining surface 131. The second joining surface 131 can be seen more clearly in FIG. 6. While the second joining surface 131 is extended along a lengthwise measure of the seat tube 13, the first joining surface 221 has a lengthwise measure similar to that of the second joining surface 131. Thereby, the front frame member 10 and the rear frame member 20 can relatively move on the pivot structure 30 to make the second joining surface 131 join with or separate from the first joining surface 221. When the first joining surface 221 and the second joining surface 131 are separated, the front frame member 10 can be further moved to next to the rear frame member 20, as shown in FIGS. 6 and 7, whereby the bicycle is settled at a folded position thereof. When the bicycle is expanded for use, the mutually contacted first joining surface 221 and second joining surface 131 can be relatively fixed with a binder 40, as shown in FIGS. 4 and 5.

In the present embodiment, the first joining surface 221 and the second joining surface 131 may include, but not limit to, the flat surfaces as shown in the drawings. The first joining surface 221 and the second joining surface 131 may be any geometrized shapes complementary mutually, e.g. toothed surfaces, waved surfaces, as long as the first joining surface 221 and the second joining surface 131 can be fittingly joined. As the second joining surface 131 is extended along the lengthwise measure of the seat tube 13, and the first joining surface 221 has the lengthwise measure similar to that of the second joining surface 131, the first joining surface 221 and the second joining surface 131 are made at most of the lengthwise measure of the front frame member 10 and the rear frame member 20, so that the contacting area between the first joining surface 221 and the second joining surface 131 is made to the largest.

At least one said binder 40 is deposited at either adjacent edges of the combining structure 21 and the seat tube 13. When the second joining surface 131 is joined with the first joining surface 221, the binder 40 facilitates enhancing the stability of the combination between the first joining surface 221 and the second joining surface 131. Thereby, the seat tube 13 and the combining structure 21 can be secured from separating so as to ensure the stability of the combination between the front frame member 10 and the rear frame member 20.

The binder 40 has one end connected to one edge of the combining structure 21 through a pivot shaft 41 such that the binder 40 can pivot on the pivot shaft 41. An opposite end of the binder 40 can be fixed at the combining structure 21 with a fixing component 42.

Referring to FIGS. 4 and 5, the binder 40 can pivot on the pivot shaft 41 so that when the first joining surface 221 and the second joining surface 131 are joined mutually, the binder 40 can embraces the seat tube 13 at a periphery of the seat tube 13 and then be fixed by the fixing component 42. Thereupon, the binder 40 exerts an external force on the seat tube 13 so as to joined the first joining surface 221 and the second joining surface 131 closely.

Although a particular embodiment of the invention has been described in detail for purposes of illustration, it will be understood by one of ordinary skill in the art that numerous variations will be possible to the disclosed embodiments without going outside the scope of the invention as disclosed in the claims.

What is claimed is:

1. A folding mechanism, comprising:
a rear frame member of a bicycle, which has a combining structure including a first joining surface;
a front frame member of the bicycle, which has a second joining surface for being joined with the first joining surface;
at least one pivot structure, which is provided at an edge of the combining structure for connecting the front frame member, such that the front frame member and the rear frame member can relatively move on the pivot structure to make the first joining surface and the second joining surface be separated or joined mutually wherein, the front frame member includes a top tube, a down tube, a seat tube and a head tube, in which the top tube and the down tube are horizontally welded with the seat tube and the head tube, which are vertically positioned, and the second joining surface is deposited on the seat tube wherein, the second joining surface is extended along a lengthwidse measure of the seat tube wherein, the rear frame member comprises the combining structure, a rear fork and a pair of chain stays, in which each of the rear fork and the chain stays has one end thereof welded with the combining structure.

2. The folding mechanism of claim 1 further comprising at least one binder, which is deposited at the combining structure of the rear frame member and a position of the front frame member adjacent to the combining structure for fixing the second joining surface of the front frame member and the first joining surface of the rear frame member at a combining position where the two joining surfaces contact mutually.

3. The folding mechanism of claim 2, wherein, the binder has one end thereof connected to one edge of the combining structure through a pivot shaft such that the binder can pivot on the pivot shaft.

4. The folding mechanism of claim 3, wherein, the binder has an opposite end thereof being fixed at the combining structure with a fixing component.

5. The folding mechanism of claim 1 wherein, the first joining surface has a lengthwise measure similar to that of the second joining surface.

* * * * *